United States Patent

Broussard

[11] Patent Number: 5,061,123
[45] Date of Patent: Oct. 29, 1991

[54] DUST COLLECTOR ADAPTOR FOR ELECTRIC DRILLS

[76] Inventor: Alphe Broussard, 64 Avenue Mohamed Diouri, Kenitra, Morocco

[21] Appl. No.: 938,429

[22] Filed: Dec. 5, 1986

[51] Int. Cl.⁵ ............................................. B23B 47/28
[52] U.S. Cl. ..................................................... 408/67
[58] Field of Search ......................................... 408/67

[56] References Cited

U.S. PATENT DOCUMENTS

| 3,583,821 | 6/1971 | Shaub et al. | 408/72 |
| 4,515,504 | 5/1985 | Moore, Sr. | 408/67 |

FOREIGN PATENT DOCUMENTS

| 2160331 | 6/1973 | Fed. Rep. of Germany | 408/67 |
| 2160831 | 6/1973 | Fed. Rep. of Germany | 408/67 |
| 2356565 | 5/1975 | Fed. Rep. of Germany | |
| 2404504 | 8/1975 | Fed. Rep. of Germany | 408/67 |
| 2604348 | 8/1977 | Fed. Rep. of Germany | 408/67 |
| 3140776 | 4/1983 | Fed. Rep. of Germany | 408/67 |
| 2441455 | 6/1980 | France | |
| 2067106 | 7/1981 | United Kingdom | 408/67 |

Primary Examiner—Larry I. Schwartz
Attorney, Agent, or Firm—Fisher, Christen & Sabol

[57] ABSTRACT

A corrugated rubber device encompassing a relatively rigid and yet expandable larger end to provide a snug fit on the drilling end of electric drills. This corrugated rubber device has recoil capabilities to accommodate the penetration of the drill bit as it progressively sinks to the depth required. This body has a transparent end to facilitate the observation of the accurate start of the drill bit, the transparent end is a holding area to accumulate dust and debris. It has a rubber tip to protect the paint or other surface being drilled.

9 Claims, 2 Drawing Sheets

DUST COLLECTOR ADAPTOR FOR ELECTRIC DRILLS

FIELD OF THE INVENTION

The invention relates to collecting dust and debris, thereby, protecting the lungs, the eyes and the face while also avoiding the soiling of furnishings when drilling holes in bricks, concrete, wood and the like when performing repairs or alterations to homes, office, etc.

BROAD DESCRIPTION OF THE INVENTION

An object of the invention is to protect the lungs, the eyes and the face from dust when drilling holes. Another object of the invention is to avoid the soiling of furnishings in the area where drilling of holes is performed.

The obvious result of the invention device is that the lungs, the eyes and the face are protected from dust, and the removal of furnishings or cleaning after the drilling of holes is not necessary, since dust and debris is simultaneously collected by the invention device.

The invention involves a corrugated rubber device adaptable to the drilling end of electric drills. It has a relatively rigid and yet expandable mouth-like larger end which is fitted with magnetized metal inserts or rubber suction cups to provide a snug and stable fit around the various types of electric drills. The body of the invention device has recoil capabilities to accommodate the penetration of the drill bit as it progressively sinks to the depth required. Preferably the end of the invention device is transparent to allow the user to observe the accurate start of the drill bit at the place previously marked for drilling. This transparent end has a rubber tip (preferably a rubber gasket around the hole in the transparent end through which the drill bit fits) to protect the paint, to ensure the collection of all dust and to help stabilize the drill bit on the marking. The transparent end is a removable holding area to accumulate the dust and debris generated when drilling holes.

DETAILED DESCRIPTION OF THE INVENTION

Figure 1:
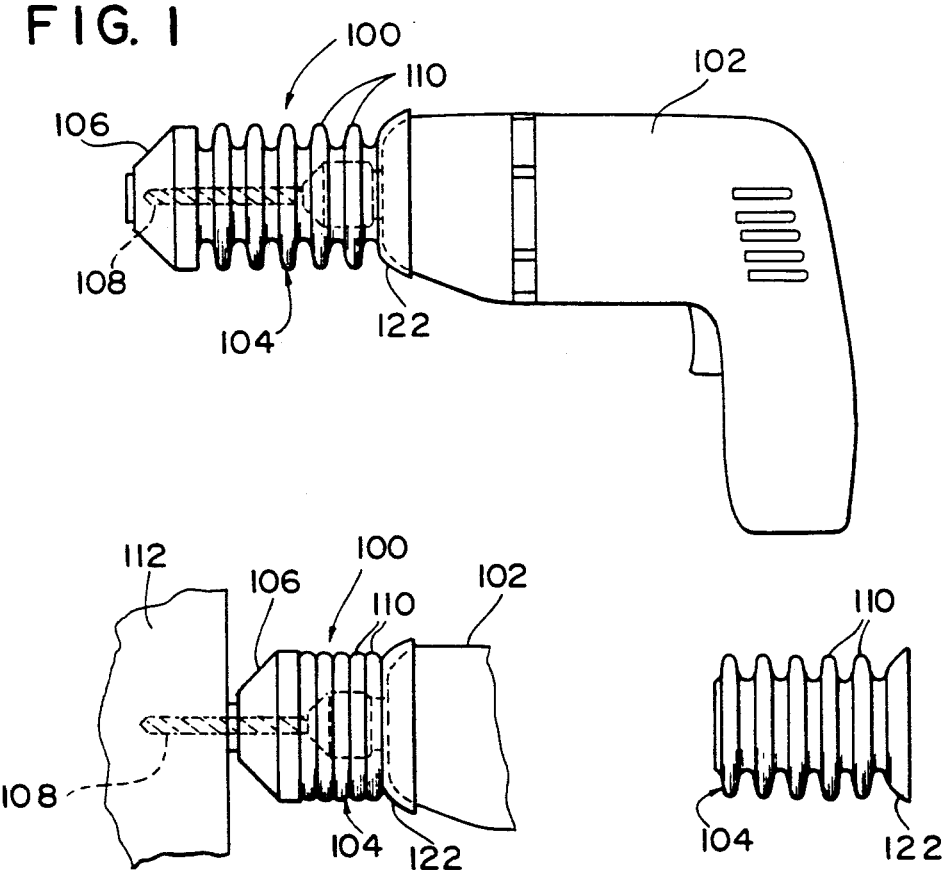
FIG. 1 is a side elevational view of the invention device mounted on an electric drill.
Figures 2, 3:
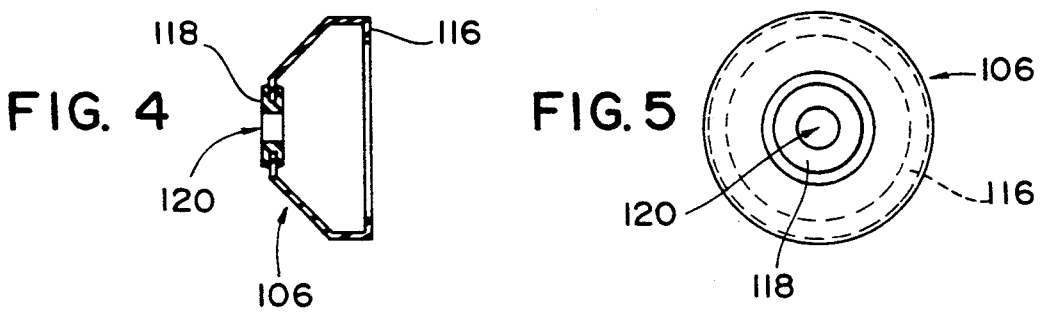
FIG. 2 is a partial side elevation of the invention device during the drilling phase.
FIG. 3 is a side elevational view of the adaptor body of the invention device.

In FIG. 1, adaptor 100 is shown mounted on the front end of electric drill 102. Adaptor 100 has body 104 and end portion 106. End portion 106 is preferably transparent as shown in FIG. 1 so that drill bit 108 can be seen and the tip of drill bit 108 placed where the user wants to drill a hole. Body 104 is collapsible, preferably having a series of rubber bellow-like folds of units 110. See FIG. 1. When electric drill 102 is pushed against a surface (112) to be drilled, folds 110 collapse upon each other as shown in FIG. 2. When pressure is released upon body 104, with drill bit 108 being pulled out of the drilled hole, resilient folds 110 of body 104 expand to their original shape whereby drill bit 108 resumes it position back in end portion 106. The dust and debris from the drilling operation are collected during the drilling operation within end portion 106.

Fold 110 of body 104 are best shown in FIG. 3. Body 104 is hollow, having passageway 114 (see FIG. 6).

Figures 4, 5:
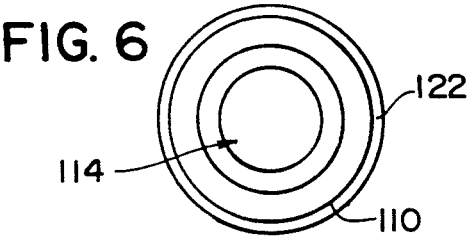
FIG. 4 is a side cross-sectional view of the end portion of the invention device.
FIG. 5 is a top elevational view of the end portion of FIG. 4.

End portion 106 is shown in cross-section in FIG. 4. The lower end of end portion 106 is open. Lip 116 fits over front fold 110 of body 104. Since front fold 110 is made of rubber or other pliable, resilient material, it can easily be fitted into the lower end of end portion 106 (as shown in FIG. 1) and held in place by lip 116 of end portion 106. This is the preferred attachment means. To empty the collected dust and debris from a drilling operation, end portion 106 is removed and the dust and debris is dumped out of end portion 106 and hollow body 104. Rubber gasket 118 fits around the edge of hole 120 in the top of end portion 106. Drill bit 108 passes through hole 120 during the drilling operation. As shown in FIG. 2, the preferred use of rubber gasket 118 protects the surface (112) to be drilled.

Figures 6, 7:
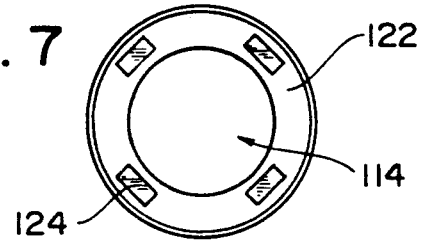
FIG. 6 is a top elevational view of the adaptor body of the invention device.
FIG. 7 is a bottom view of one embodiment of the adaptor body of the invention device.
Figure 8:
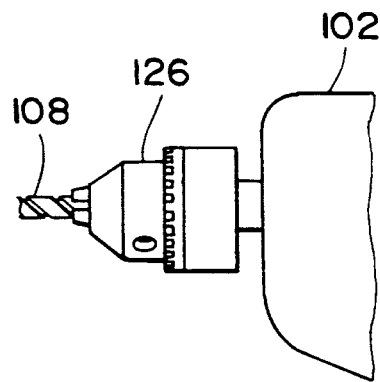
FIG. 8 is a partial elevational view of the front end of one type of electric drill.
Figure 13:
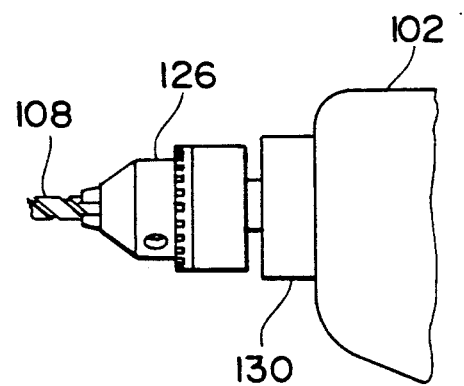
FIG. 13 is a partial elevational view of the front end of another type of electric drill.
Figure 9:
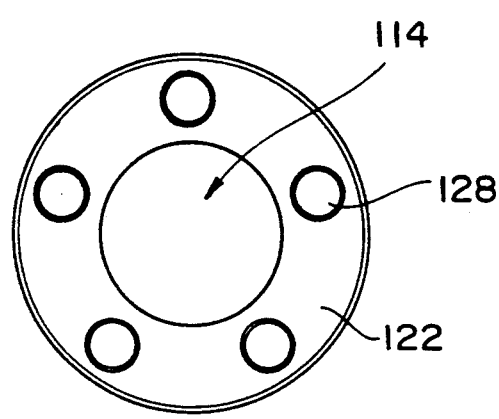
FIG. 9 is a bottom view of another embodiment of the adaptor body of the invention device.
Figure 10:
FIG. 10 is a side elevational view of the suction cups used in the embodiment of FIG. 9.
Figure 11:
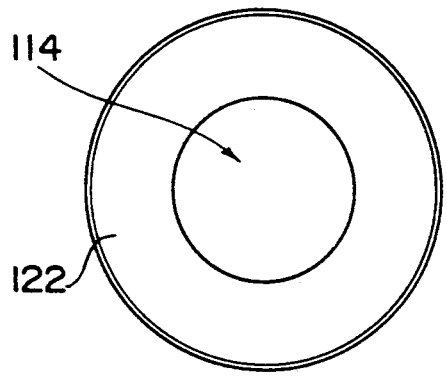
FIG. 11 is a bottom elevational view of another embodiment of the adaptor body of the invention device.
Figure 12:
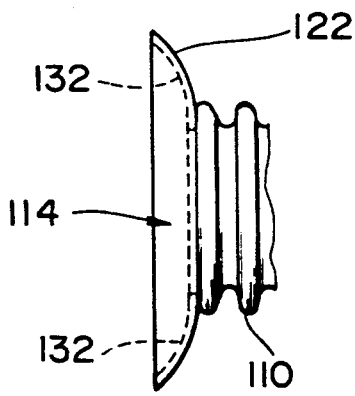
FIG. 12 is a partial side elevational view of the bottom portion of the embodiment of FIG. 11.

Adaptor body 104 has bottom rim 122, which extends down and out from the bottom of body 104 to fit snugly on the front end of electric drill 102 (as shown in FIG. 1). FIG. 6 shows a top view of adaptor body 104. Magnets 124 (as shown in FIG. 7) mounted on the inside of bottom rim 122 can be used to secure bottom rim 122 against the front end of electric drill 102. This version of adaptor 100 is best used with an electric drill 102 of the type shown in FIG. 8, where bit 126 is located very close to the front end of electric drill 102. Preferably, suction cups 128 (see FIGS. 9 and 10) mounted on the inside of bottom rim 122 can be used to secure bottom rim 122 against the front end of electric drill 102. This preferred version is best used with the electric drill 102 of the type shown in FIG. 8. When electric drill 102 has extension portion 130 (as shown in FIG. 13), preferably the version of adaptor body 104 shown in FIGS. 11 and 12 is used. In such version, hole 114 of body 104 is constructed at its lower end of rim 132 so as to snugly fit over extension portion 130 to hold adaptor 100 in place against and on electric drill 102.

What is claimed is:

1. A corrugated device used as an adaptor to electric drills, comprising:
    (a) resilient, pliant adaptor body having a relatively rigid and yet expandable mouth-like larger end, which has attachment means having on its inner surface attachment units selected for the group consisting of magnetized metal inserts and rubber suction cups, to provide a snug and stable fit around the drill-holding end of the various types of electric drills;

(b) the adaptor body having a transparent end, with a hole therein, to observe the accurate start of the drill bit at the place previously marked for drilling;

(c) a rubber tip fitting in the hole in the transparent end of the adaptor body to protect the paint or other surface being drilled, to ensure the collection of all dust and to help stabilize the drill bit at the place previously marked for drilling, the rubber tip have a hole therein through which the drill bit passes when the drill bit end of the drill is pressed against an external surface, the hole in the rubber tip being only slightly wider than the drill bit;

(d) the transparent end being a holding area to accumulate the dust debris generated when drilling holes; and (e) the corrugated device having recoil capabilities to accommodate the penetration of the drill bit as it progressively sinks to the depth required.

2. The device of claim 1 wherein the inner surface of the mouth like larger end of the adaptor body has magnetized metal inserts.

3. The device of claim 1 wherein the inner surface of the mouth of the adaptor body has suction cups.

4. The device of claim 1 wherein the rubber tip is a rubber gasket.

5. The device of claim 1 wherein the adaptor body includes a series of bellow-like folds.

6. The device of claim 1 wherein the adaptor body is a rubber adaptor body.

7. The device of claim 1 wherein the transparent end is inwardly slanted.

8. The corrugated device of claim 1 in combination with an electric drill, said corrugated device being mounted on the electric drill so as to overlie the chuck and drill bit thereof.

9. A corrugated device used as an adaptor to electric drills, comprising:

(a) resilient, pliant adaptor body having a relatively rigid and yet expandable mouth-like larger end, which has attachment means, to provide a snug and stable fit around the drill holding end of the various types of electric drills;

(b) the adaptor body having a transparent end, with a hole therein, to observe the accurate start of the drill bit at the place previously marked for drilling, (c) a rubber tip fitting in the hole in the transparent end of the adaptor body to protect the paint or other surface being drilled, to ensure the collection of all dust and to help stabilize the drill bit at the place previously marked for drilling, the rubber tip having a hole therein through which the drill bit passes when the drill bit end of the drill is pressed against an external surface, the hole in the rubber tip being only slightly wider than the drill bit;

(d) the transparent end being a holding area to accumulate the dust and debris generated when drilling holes; and (e) the corrugated device having recoil capabilities to accommodate the penetration of the drill bit as it progressively sinks to the depth required.

* * * * *